United States Patent
Heinz et al.

(10) Patent No.: US 9,321,197 B2
(45) Date of Patent: Apr. 26, 2016

(54) PROCESS FOR THE PRODUCTION OF A COMPOSITE PART WITH MULTI-PART OUTER LAYER, AND COMPOSITE PART

(75) Inventors: Claus Heinz, Rheinzabern (DE);
Bernhard Baumann, Lustadt (DE);
Andreas Meyer, Hatzenbuehl (DE);
Bernd Hemberger, Herxheim (DE);
Christian Koetter, Steinweiler (DE);
Christo Gavrilov, Munich (DE)

(73) Assignee: FAURECIA INNENRAUM SYSTEME GMBH, Hagenbach (DE)

( * ) Notice: Subject to any disclaimer, the term of this patent is extended or adjusted under 35 U.S.C. 154(b) by 1161 days.

(21) Appl. No.: 12/312,757

(22) PCT Filed: Nov. 27, 2007

(86) PCT No.: PCT/EP2007/010446
§ 371 (c)(1),
(2), (4) Date: Mar. 12, 2010

(87) PCT Pub. No.: WO2008/064915
PCT Pub. Date: Jun. 5, 2008

(65) Prior Publication Data
US 2010/0181794 A1 Jul. 22, 2010

(30) Foreign Application Priority Data
Nov. 27, 2006 (DE) .......................... 10 2006 056 535

(51) Int. Cl.
*B29C 65/00* (2006.01)
*B29C 44/14* (2006.01)
(52) U.S. Cl.
CPC .................................... *B29C 44/141* (2013.01)

(58) Field of Classification Search
USPC ......... 264/46.5, 1.7, 440, 471, 480, 487, 490, 264/493, 45.1, 642, 241, 415
See application file for complete search history.

(56) References Cited

U.S. PATENT DOCUMENTS

| 4,136,630 A | * | 1/1979 | Fraser ...................... 114/102.27 |
| 5,297,842 A | * | 3/1994 | Hayashi ..................... 296/146.7 |
| 6,318,783 B1 | * | 11/2001 | Knox ........................... 296/39.1 |
| 6,447,004 B1 | | 9/2002 | Kawakubo et al. |

(Continued)

FOREIGN PATENT DOCUMENTS

| DE | 44 17 102 A1 | 11/1995 |
| DE | 298 23 765 U1 | 11/1999 |

(Continued)

*Primary Examiner* — Stella Yi
(74) *Attorney, Agent, or Firm* — Marshall & Melhorn, LLC

(57) ABSTRACT

The invention relates to a process for the production of a composite part with a multi-part outer layer and with a foam layer bonded on the reverse side to the outer layer, in particular internal cladding of a vehicle, and also to a composite part. The inventive process comprises the following steps: a) arrangement of a first skin and of a second skin with angled-off end regions on the surface of a mold in such a way that the angled-off end regions of the first and second skin have firstly been oriented away from the surface of the mold and secondly are adjacent to one another; b) application of a reduced pressure in the region of the position of the angled-off end regions, in such a way that the angled-off end regions are pressed two-dimensionally against one another; c) reverse-side foaming of the first and second skin with a foam composition. The inventive process permits the simple production of visually attractive composite parts with multi-part outer layer.

12 Claims, 3 Drawing Sheets

(56) References Cited

U.S. PATENT DOCUMENTS

Figure 1:
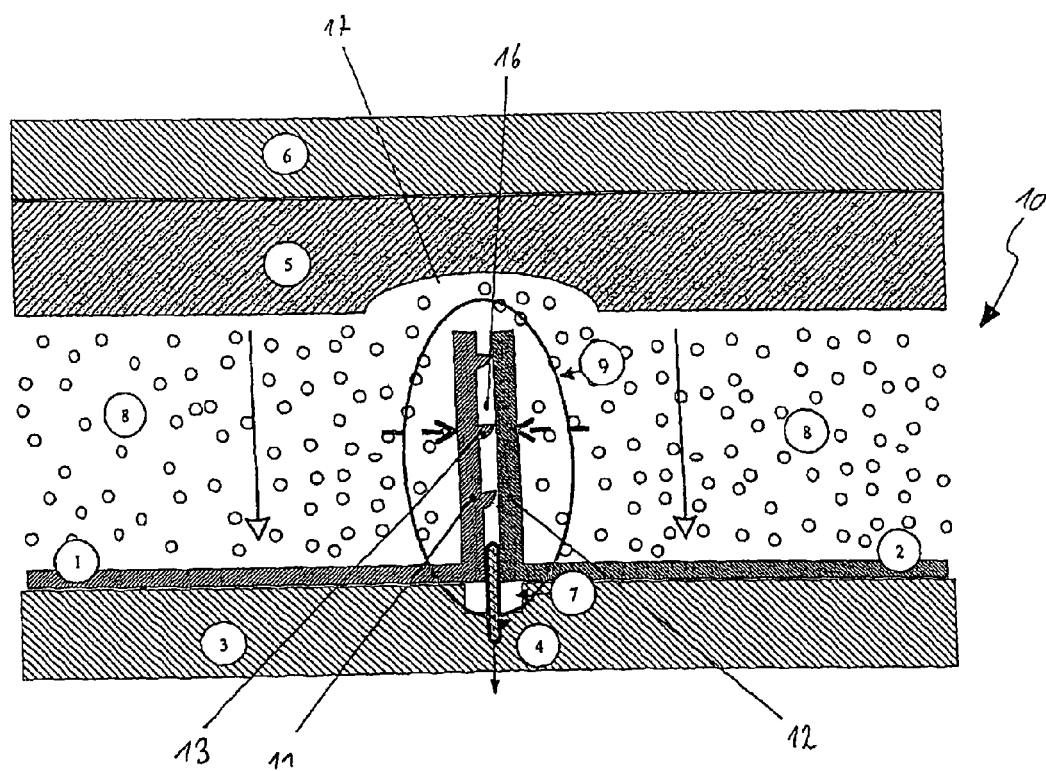

| | | |
|---|---|---|
| 6,991,841 B2 | 1/2006 | Cowelchuk et al. |
| 7,147,809 B2 | 12/2006 | Cowelchuk et al. |
| 7,235,206 B2 | 6/2007 | Kobayashi et al. |
| 2006/0037795 A1* | 2/2006 | Cowelchuk et al. ............ 180/90 |
| 2006/0100117 A1 | 5/2006 | Smith |
| 2006/0127636 A1* | 6/2006 | Bondar et al. ................ 428/119 |
| 2007/0029829 A1* | 2/2007 | Johnson et al. .............. 296/1.08 |
| 2007/0064938 A1* | 3/2007 | Muller et al. ................. 380/201 |
| 2007/0128410 A1* | 6/2007 | Nelias ........................... 428/156 |

FOREIGN PATENT DOCUMENTS

| | | |
|---|---|---|
| DE | 10 2004 021 222 A1 | 12/2004 |
| DE | 10 2005 014 085 A1 | 9/2006 |
| EP | 0 683 030 B1 | 12/1998 |
| JP | 7137051 A | 5/1995 |

* cited by examiner

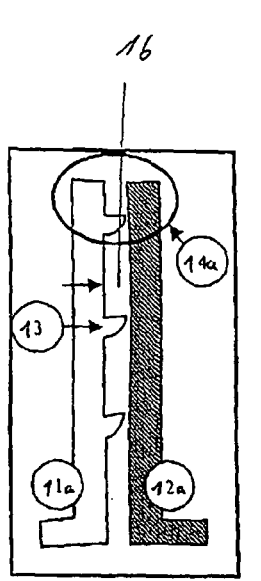
Figur 2
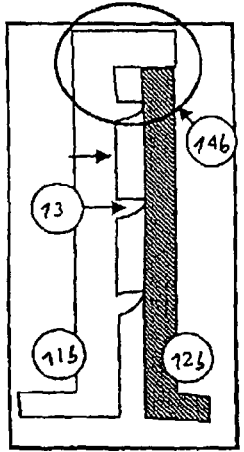
Figur 3
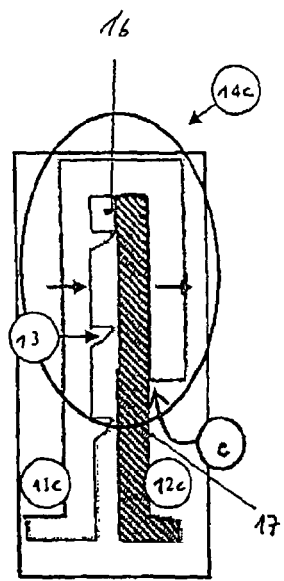
Figur 4
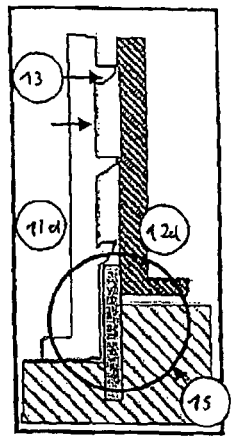
Figur 5
Figur 6
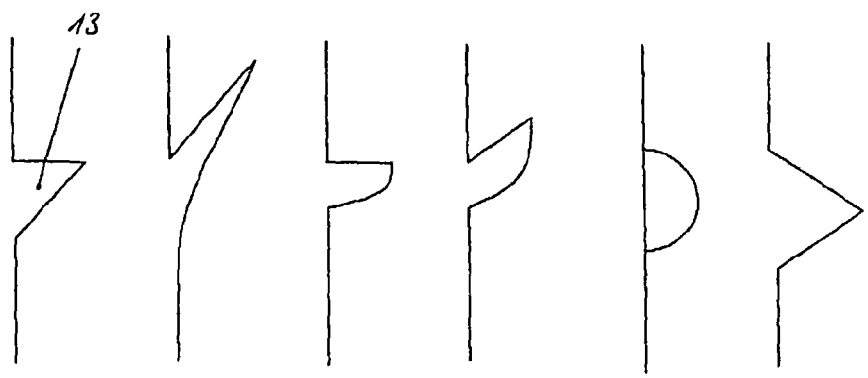

PROCESS FOR THE PRODUCTION OF A COMPOSITE PART WITH MULTI-PART OUTER LAYER, AND COMPOSITE PART

BACKGROUND OF THE INVENTION

The invention relates to a method for the production of a composite part, in particular an interior trim part for vehicles, with a multipart cover layer, and also to a composite part.

Composite parts which have a carrier, a decorative layer and a foam layer, which is situated between carrier and decorative layer and connects carrier and decorative layer to each other, are known.

Furthermore, it is known to construct the decorative layer to be multipart comprising at least two skins which are situated adjacently relative to each other.

It is problematic in the production of a component with a multipart decorative layer that, during the rear-foaming, foam can escape in the region of the separating line between the adjacent skins.

In order to prevent this, the patent JP 3347850 discloses a method according to which two skins with angled-off end regions are disposed on the surface of a tool in such a manner that the angled-off end regions of the first and second skin are directed away from the surface of the tool. The end region of one skin has at least one sealed portion in the form of a protuberance which can engage into a corresponding opening or hollow of the oppositely situated end region of the other skin. Correspondingly, the two skins are connected to each other to form a seal. Thereafter, the skins are foamed to each other.

The disadvantage of this solution is that, in order to ensure sufficient impermeability, the sealed portions must be configured in a relatively complex manner, that the skins must have a certain degree of rigidity in order to retain their shape and that an exact arrangement of the skins must be ensured.

It is the object of the present invention to produce a method with which composite parts can be produced with a rear-foamed multipart cover layer, which method enables an uncomplicated arrangement of the skins forming the cover layers and also can ensure sufficient impermeability during the rear-foaming. It is a further object to produce a composite part with a rear-foamed optically attractive, multipart cover layer.

These objects are achieved by a method and a composite part according to the independent claims.

Advantageous developments are described in the dependent claims.

BRIEF SUMMARY OF THE INVENTION

The invention produces a method for the production of a composite part, in particular an interior trim, with a multipart cover layer and a foam layer which is connected to the cover layer on the rear-side, containing the steps: a) arrangement of a first skin and of a second skin with angled-off end regions on the surface of a tool in such a manner that the angled-off end regions of the first and second skin are directed, on the one hand, away from the surface of the tool and, on the other hand, are adjacent to each other; b) application of a low pressure in the region of the position of the angled-off end regions so that the angled-off end regions are pressed against each other flatly; c) rear-foaming of the first and second skin with a foam material.

There is intended to be understood by "skin" within the scope of the invention in particular the flat elements used for decorative layers of interior trim parts of vehicles, such as slush skins, cast skins, sprayed skins, single or multilayer films, textiles or woven fabric and/or leather or imitation leather. The layer thicknesses of such skins are in particular in the range of 0.5 to 1.5 mm.

Due to the low pressure, the end regions of both skins are pressed against each other, a possible gap between the end regions is closed. Due to the active pressing of the end regions against each other, it is possible to prevent foam material being able to penetrate through a gap between the end regions to the visible surface of the skins during rear-foaming.

The low pressure is preferably applied without interruption along the entire visible-side separating line of the two skins which are to be sealed and are produced on the visible side by the angled-off end regions in order to achieve an effective uniform sealing effect along the entire separating line. In order to apply a low pressure along the entire course of the separating line to be sealed, a vacuum groove and/or borings can be introduced for example on the tool surface directly at the intended position of the separating line, or a projection which is capable of creating a vacuum can be provided.

The low pressure applied in the region of the angled-off end regions or of the separating line (sealing low pressure) differs qualitatively from the low pressure which can be applied when inserting the skins in order to fix the skin within the tool and to retain it in position (fixing low pressure).

Within the method, the fixing low pressure of the first and second skin is only a partial step and is not sufficient to produce the required sealing between the angled-off end regions. Reference should be made at the same time to the fact that the presence of a fixing low pressure merely represents an advantageous extension of the method, i.e. is not absolutely necessary.

Since the skins are fixed to each other via the foam, any combinations of different types of skins can be used.

Between the tool surface and the skins, a low pressure is likewise applied preferably over a large area in order to keep the skins in position in the tool. In order to apply such a low pressure, suitable air evacuation channels and/or borings can be provided in the tool.

The composite parts produced in this manner are suitable in particular as interior trims for the interior of vehicles, for example as instrument panel, as central console or as door trim.

An advantageous development of the invention provides that at least the first skin is configured in the end region thereof with one or more sealing lips, and the at least one sealing lip is orientated, during arrangement of the skin in the tool, towards the end region of the other skin.

By applying the low pressure, the sealing lips are pressed against the surface of the oppositely situated end region of the other skin. In addition, it is possible to use the foam pressure in order to press the end regions against each other. The number of sealing lips depends upon the required impermeability.

Preferably, the one skin at least in the region of the sealing lips, preferably at least in the end region thereof, comprises a soft, elastic material and the other skin, in the end region thereof, a hard, firm material. As a result, the sealing effect is increased, on the one hand, and also the position of the end regions is stabilised in particular during the rear-foaming. In particular, also the sealing lips can hence comprise the firm material, the elastic region in this case would be formed by the other skin.

Advantageously, the low pressure in the region of the angled-off end regions is between 40%-100% of a total vacuum, in particular preferably greater than 60% and less than 90% of a total vacuum. The percentage details relate to the air volume which must be evacuated in order to produce a vacuum, i.e. 100% of a total vacuum means complete evacuation of the air volume.

In a particularly advantageous manner, a low pressure applied for positioning the skins is weaker than the low pressure in the region of the angled-off end regions. Preferably, the low pressure for the positioning is up to 50% of a total vacuum.

It can also be the case that two skins made of the same material (with different colours) are combined.

An advantageous development of the invention provides that the first skin and the second skin are disposed on the right and left-hand side of a projection situated on the tool surface.

By providing a projection of this type, the positioning of the skins and hence the course of the separating line of the two skins can be fixed exactly. The projection preferably follows the entire course of the desired separating line.

Preferably, a low pressure is applied for positioning (sealing pressure) via the projection, which low pressure fixes the skin on the projection and makes possible a sealing effect between the angled-off end regions. For this purpose, the projection preferably has a porous, gas-permeable material or is provided with vacuum borings and/or with a vacuum groove.

In addition to the sealing low pressure, a further low pressure (fixing low pressure) ensures a large-area fixing of the skins in the surface of the tool.

Advantageously, the fixing low pressure is weaker than the sealing low pressure. Firstly the sealing low pressure and subsequently the fixing low pressure are thereby applied. In this way, the skins can be placed in the tool, subsequently drawn into position by the low pressure applied in the region of the subsequent separating line and thereafter fixed in their entirety.

Advantageously, the tool in which the first and second skin can be inserted has therefore two low pressure cycles: a fixing low pressure and, in the region of the angled-off end regions, a sealing low pressure for sealing the separating line.

Because of the different low pressure cycles, the low pressure cycles being actuated at least independently of each other, the method can be implemented or the composite part can be produced particularly advantageously. In the case of a suitable tool with a large number of air evacuation channels, it is thus possible, by means of suitable allocation of the air evacuation channels to the sealing cycle, for a large number of different separating line courses to be defined, such as S-shaped or curved separating lines or spatially, i.e. separating lines extending also in the third spatial dimension.

Of course, these separating line geometries can be produced by means of a corresponding projection or protrusion.

An advantageous development of the invention provides that the projection is lowered at least partially in the tool during curing of the foam material.

By lowering the projection during the curing of the foam material, a gap is opened between the two first angled-off regions of the two skins. By means of the foam material, the skins are pressed against each other so that this opened space is sealed at least partially by the skins which move up.

The projection can be lowered completely or be loaded in order to produce a design groove in a position in which it protrudes at least partially into the cavity.

An advantageous development of the invention provides that the end region of one of the two skins is angled-off for a second time and is disposed in such a manner that the second angled-off region of the end region, after arrangement of the skins in the tool, completely covers the gap between the end regions of the first and second skin.

The end region of one of the two skins is preferably configured and disposed in such a manner that the latter covers not only the gap between the end regions but in addition at least a part of the rear-side of the oppositely situated end region. The one end region is surrounded in this way by the other end region. In this way, the path which the foam material must overcome in order to emerge on the visible side of the cover layer is lengthened on the one hand. On the other hand, it is possible to use the foam which penetrates between a gap which is formed by the rear-side of the surrounded end region and the oppositely situated inner surface of the externally situated end region for mutual pressing together of the two end regions, as result of which the sealing effect can likewise be increased.

The skins are preferably preformed before arrangement in the tool corresponding to the described shapes of the end regions.

An advantageous development of the invention provides that the foam material is introduced on both sides of the end regions of the two skins in such a manner that the foam fronts reach the end regions of the skins at the same time.

This prevents the end regions being tilted by too strong pressure of the foam material on the end regions on one side.

It is possible in particular to introduce different foam materials on the right and left-hand side. Haptics which are different in regions for example can be produced herewith.

Figure 7:
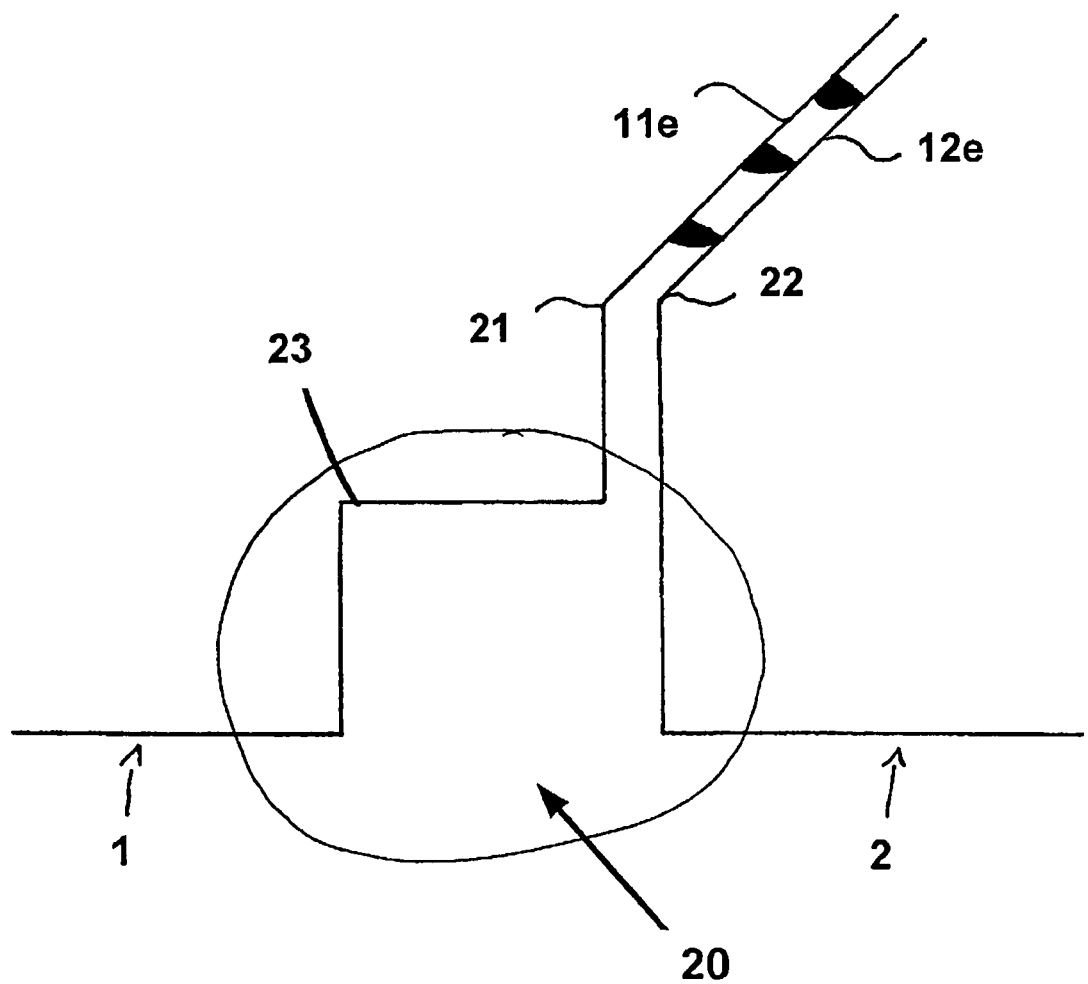

The invention is now explained in more detail with reference to embodiments which are represented by several Figures. There are thereby shown:

FIG. 1 an embodiment of a method according to the invention after completion of the foaming process and also a composite part according to the invention, FIG. 2 a first embodiment of the end regions of two skins, FIG. 3 a second embodiment of the end regions of two skins, FIG. 4 a third embodiment of the end regions of two skins, FIG. 5 a fourth embodiment of the end regions of two skins, FIG. 6 different possible configurations of sealing lips, FIG. 7 a variant of the angled-off end regions.

DETAILED DESCRIPTION OF THE INVENTION

According to one embodiment of a method according to the invention, an interior trim with a multipart cover layer is produced.

A carrier 5 is firstly disposed in an upper tool 6 of a foaming tool.

In a lower tool, a first skin 1 and a second skin 2 with their end regions which are angled-off respectively inwardly by 90° are disposed on the right and left-hand side of a protrusion 4 which is situated in the lower tool, protrudes partially beyond the tool surface and can be lowered. The skins 1, 2 are disposed in such a manner that the angled-off end regions 11, 12 are adjacent to each other and directed away from the surface of the lower tool 3. In this case, the first angled-off regions 11, 12 are orientated perpendicular to the surface of the lower tool 3.

The ends of the skins 1, 2 extend almost up to the height of the surface of the carrier 5. In order not to impede the flow of foam during the subsequent foaming process, the carrier 5 in the region which is situated opposite the regions 11, 12 which are angled-off to the ends is configured with a recess in the form of a convexity 17.

The first skin 1 is configured in its end region 11 with three sealing lips 13. The sealing lips are disposed such that these are orientated towards the end region of the second skin 2 during arrangement of the skins 1, 2 in the tool.

By applying a low pressure via air evacuation openings in the lower tool 3, which are not illustrated in more detail, the skins 1, 2 disposed in the lower tool are fixed in their position. On the protrusion 4, which comprises a microporous material in this case (alternatively or additionally the protrusion can be provided with vacuum borings and/or a vacuum groove), a low pressure is likewise applied via a vacuum groove 7 which is situated on the surface of the lower tool 3, as a result of which the skins 1, 2 are pressed against the protrusion 4 on the one hand and, on the other hand a possible 16 between the first angled-off regions 11, 12 is closed. In particular, the sealing lips 13 are pressed against the oppositely situated surface of the end region 12 of the second skin 2 when the low pressure is applied. Protrusion 4 and vacuum groove 7 are configured in such a manner that these extend continuously along the entire region, to be sealed, of the separating line of the two skins 1, 2, as a result of which it is ensured that a uniform contact pressure is present along the mentioned course of the separating line.

Alternatively, for example a solid protrusion 4 can be used. The pressing of the two end regions 11, 12 together is effected in this case by applying a low pressure in the vacuum groove 7.

Thereafter, the tool is closed.

A foam material 8 is introduced into the cavity defined by carrier 5 and skins 1, 2 via two foam mixer heads (not illustrated) on the right and left-hand side of the boundary region of the two skins 1, 2 defined by the protrusion 4. In this case, the foam material is identical on the right and left-hand side and is introduced at the same time. Alternatively, also different foam materials are possible for example in order to produce different haptics of the composite part. Furthermore, the foam materials can be introduced with a time delay dependent upon the desired spreading of the foam. According to the component to be produced, also only one foam head can be provided (simultaneous introduction of foam on the right and left-hand side of the protrusion is of course no longer possible in this case) or more than only two foam heads can be provided.

The point of entry and time of introduction of the foam materials is chosen in this case such that the foam material with the foam fronts thereof reach the end regions 11, 12 at the same time. Alternatively, it would however also be possible to introduce the foam material in such a manner that the foam fronts reach the end regions with a time delay.

The foam material 8, when impinging on the end regions 11, 12 of the two skins, presses these against each other, in particular the sealing lips 13 against the surface of the oppositely situated end region 12. As a result of the curing of the foam material 8, the pressing of the first angled-off regions 11, 12 against each other and hence the sealing effect in the sealing region 9 is increased in addition. The foam 8 penetrates between the end regions 11, 12 merely in the region of the ends of the skins 1, 2.

FIG. 1 shows this state of the method.

During curing of the foam material 8, the protrusion 4 is lowered completely in the lower tool 3. As a result of the pressure of the foam material, the skins 1, 2 move up into the space opened up by the protrusion 4. The visible-side groove between the skins 1, 2 is closed almost completely.

After the foam material 8 has acquired sufficient rigidity due to the curing process, the thus produced composite part 10 with a multipart cover layer formed by the skins 1, 2, here an instrument panel 10, can be removed from the foaming tool.

The carrier 5 in this embodiment is made of PP with a glass fibre component. Of course, other materials are possible, in particular thermoplastic materials, such as POM or ABS/PC, including supplements, such as for example fibres or minerals. The thickness of the carrier is approx. 2.4 mm.

The first skin 1 is a soft, flexible PVC slush skin with a thickness of 1.0 mm. The hardness is approx. 50 Shore A. The second skin 2 is a firm TPU slush skin with a thickness likewise of 1.0 mm. The hardness is approx. 80 Shore A. The angled-off end regions of both skins were preformed within the scope of the slush process.

A PU foam is used as foam material 8 in this case.

As an alternative to the above foaming methods, it is likewise possible to introduce the foam material when the tool is open and only then to close the tool.

In a second embodiment of the method according to the invention, in contrast to the first embodiment, the protrusion 4 remains in its position, is therefore not lowered. The thus produced composite part has a design groove in the region of the separating line of both skins 1, 2.

FIGS. 2 to 5 show different embodiments of end regions 11, 12 of the two skins 1, 2. The above-described methods can be transferred to these embodiments analogously.

FIG. 2 shows a first embodiment of end regions 11a, 12a of two skins which was described within the scope of the above method. The end region 11a of the first skin comprises a flexible material, the end region 12a of the second skin a firm material. The sealing lips 13 of the end region 11a are placed against the surface of the end region 12a of the second skin when the low pressure is applied and because of the foam pressure, which second skin offers sufficient resistance because of the rigidity thereof. The skin geometry 4a allows penetration of the foam 8 into the joint 16, as a result of which adhesion of the two skins on the contact surface also can be effected. The number of sealing lips 13 is designed to be dependent upon the foam system, in particular upon the pressure.

FIG. 3 shows a second embodiment of end regions 11b, 12b. In contrast to the first embodiment, the gap or the joint 16 is covered by the end region 11b of the first skin, as a result of which flowing of the foam material 8 into the joint 16 is prevented. The end region 11b is configured for this purpose to be slightly longer than the end region 12b of the second skin and is angled-off for second time. The joint 16 is closed with the angled-off second region. In order to produce this skin geometry 14b of the end region 11b with this exact contour, a tearing seam can be provided for example in the slush process in order to produce the skin.

FIG. 4 shows a third embodiment of end regions 11c, 12c of two skins 1, 2. The end region 11c of the first skin 1 is drawn over the joint 16 up to the rear-side 17 of the end region 12c of the second skin. For this purpose, the end region is angled-off three times and forms a U-shaped region which is open in the direction of the surface of the lower tool 3 and in which the end region 12c, angled-off once, of the second skin is disposed. With this skin geometry 14c, the joint 16 between the end regions 11c, 12c is sealed analogously to the second embodiment. Furthermore, via a desired penetration of the foam material into the gap c) between the end of the end region 11c of the first skin and the rear-side 17 of the second skin, this geometry makes it possible to use the movement resulting therefrom of the second end region 12c against the sealing lips 13 of the first end region 11c in order to assist the sealing effect. In order to produce this skin geometry 14c of the end region 11c with this exact contour, a tearing seam can be provided for example in the slush process for producing the skin.

FIG. 5 shows a fourth embodiment of end regions 11c, 12c of two skins 1, 2. Deviating from the previous embodiments, the separation of the skins 1, 2 is produced by a step 15 in the lower tool. Both end regions 11c, 12c are angled-off once at right angles analogously to the first embodiment and end at a common height, as a result of which the end region 12d of the second skin is shortened in its length corresponding to the height of the step 15.

The step 15 can be disposed both in the region of the first skin 1 and in the region of the second skin 2. Furthermore, a protrusion is introduced in this embodiment in order to produce a design groove. It is likewise possible to provide such a step within the scope of the above-described embodiments.

FIG. 6 shows different shapes of sealing lips 13.

According to the above-described methods, see also FIG. 1, an interior trim 10 with a multipart cover layer comprising a first skin 1 and a second skin 2 and a foam layer 8 which is connected to the cover layer on the rear-side is produced, the end regions 11, 12 of the first skin 1 and of the second skin 2 being angled-off, the skins being disposed in such a manner that the angled-off end regions 11, 12 are adjacent to each other and protrude into the foam layer 8, and the first skin 1 in its end region 11 having sealing lips 13 which are pressed against the end region 12 of the other skin 2, the first skin 1 comprising a soft material with a hardness of approx. 50 Shore A, and the second skin 2 comprising a firm material with a hardness of approx 80 Shore A, and the wall thickness of the first skin 1 and of the second skin 2 respectively being 1.0 mm. In the case of the first embodiment of the method, almost no separating joint is visible in the region of the separating line of the two skins 1, 2, in the case of the second embodiment of the method, the composite part has a design groove in the region of the separating line. The features described within the scope of the embodiments of the different end regions, see FIGS. 2 to 5, are transferred correspondingly to the composite part produced in this manner.

In FIG. 7, an advantageous development of the geometry of the angled-off end regions is represented. The state of the end regions of the skins 1 and 2 which are brought in contact by applying the sealing low pressure is hereby represented.

The angled-off end regions 11e and 12e of the first skin 1 and of the second skin 2 have, in addition to the regions angled off inwards respectively by 90°, an additional angled-off portion 21 or 22 which is angled-off opposite the first angled-off region 20 in a range between 30°-60°, here 45°. Of course, this variant can be combined with the other embodiments.

The advantage of the second angled-off portion resides in the fact that a greatly improved sealing effect can be achieved for the end regions 11e, 12e having additional intrinsic tension which occurs because of the second angled-off portion of the first skin 1. A composite part with end regions which are angled-off twice in this manner has a greatly improved separating line, which leads to a longer lifespan of the composite part.

The angled-off portions 21 and 23, which can be introduced already in the original form or reforming process, are in total three angled-off portions. The double angled-off portion 23—although twice in the region of the first skin 1—should be understood as part of the first angled-off portion 20. The second angled-off portion 21, 22 is distinguished in that the end regions of the first and of the second skin abut against each other both in front of and after the second angled-off portion.

The advantages of the method according to the invention and of the composite part which can be produced therewith reside in particular in the possibility of combining different skins, for example high-quality with lesser quality, in easy insertion and positioning of the skins, in the automatically sealing skin geometry, in the visible material transition with visible joint, in the increase in appearance value and in the integration of the joining process of the skins within the scope of the foaming process.

The invention claimed is:

1. A method for production of a composite part, in particular an interior trim, with a multipart cover layer and a foam layer which is connected to the cover layer on a rear-side, containing the steps:
    a) arrangement of a first skin and of a second skin with angled-off end regions on a surface of a tool in such a manner that the angled-off end regions of the first and second skin are directed, on the one hand, away from the surface of the tool and, on the other hand, are adjacent to each other, wherein at least the first skin is configured in the end region thereof with one or more sealing lips integral with the first skin, and the at least one sealing lip is orientated, during arrangement of the first skin in the tool, towards the end region of the second skin;
    b) application of a low pressure in the region of the position of the angled-off end regions so that the angled-off end regions are pressed against each other flatly, where the low pressure is a partial vacuum; and
    c) rear-foaming of the first and second skin with a foam material while applying the low pressure.

2. The method according to claim 1, characterized in that the end region of one of the two skins is angled-off for a second time and is disposed in such a manner that the second angled-off region of the end region, after arrangement of the skins in the tool, completely covers a gap between the end regions of the first and second skin.

3. The method according to claim 2, characterized in that the foam material is introduced on both sides of the end regions of the two skins in such a manner that the foam reaches the end regions of the skins at the same time.

4. The method according to claim 1, where the partial vacuum is between 40% and 100% of a total vacuum.

5. A method for production of a composite part, in particular an interior trim, with a multipart cover layer and a foam layer which is connected to the cover layer on a rear-side, containing the steps:
    a) arrangement of a first skin and of a second skin with angled-off end regions on a surface of a tool in such a manner that the angled-off end regions of the first and second skin are directed, on the one hand, away from the surface of the tool and, on the other hand, are adjacent to each other, wherein at least the first skin is configured in the end region thereof with one or more sealing lips integral with the first skin and wherein the at least one sealing lip is orientated, during arrangement of the first skin in the tool, towards the end region of the second skin and the first skin and the second skin are disposed on the right and left-hand side of a projection situated on the tool surface;
    b) application of a low pressure in the region of the position of the angled-off end regions so that the angled-off end regions are pressed against each other flatly and so that the at least one sealing lip contacts the second skin, where the low pressure is a partial vacuum applied through the projection situated in the tool surface; and
    c) rear-foaming of the first and second skin with a foam material while applying the low pressure.

6. The method according to claim 5, where the projection comprises at least one of a porous material, gas-permeable material, vacuum borings or a vacuum groove.

7. A method for production of a composite part, in particular an interior trim, with a multipart cover layer and a foam layer which is connected to the cover layer on a rear-side, containing the steps:
- a) arrangement of a first skin and of a second skin with angled-off end regions on a surface of a tool in such a manner that the angled-off end regions of the first and second skin are directed, on the one hand, away from the surface of the tool and, on the other hand, are adjacent to each other, wherein the first skin and the second skin are disposed on the right and left-hand side of a projection situated on the tool surface;
- b) application of a sealing partial vacuum pressure in the region of the position of the angled-off end regions so that the angled-off end regions are pressed against each other flatly, where a fixing partial vacuum pressure is weaker than the sealing partial vacuum pressure, the fixing partial vacuum pressure being applied for fixing the first and second skin on the surface of the tool; and
- c) rear-foaming of the first and second skin with a foam material while applying the sealing partial vacuum pressure between the angled-off end regions by the projection.

8. The method according to claim 7, where the tool comprises two low pressure cycles.

9. The method according to claim 1, wherein the first and second skin have a thickness between 0.5 mm and 1.5 mm.

10. The method according to claim 1, wherein the first and second skin include one of textiles, woven fabric, leather or imitation leather.

11. The method according to claim 7, wherein the first and second skin have a thickness between 0.5 mm and 1.5 mm.

12. The method according to claim 7, wherein the first and second skin include one of textiles, woven fabric, leather or imitation leather.

* * * * *